United States Patent
Luthra

(10) Patent No.: US 8,462,197 B2
(45) Date of Patent: Jun. 11, 2013

(54) 3D VIDEO TRANSFORMING DEVICE

(75) Inventor: Ajay K. Luthra, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 595 days.

(21) Appl. No.: 12/640,630

(22) Filed: Dec. 17, 2009

(65) Prior Publication Data

US 2011/0149026 A1    Jun. 23, 2011

(51) Int. Cl.
*H04N 13/00*    (2006.01)
(52) U.S. Cl.
USPC .......................................................... 348/43
(58) Field of Classification Search
USPC .......................................................... 348/43
See application file for complete search history.

(56) References Cited

U.S. PATENT DOCUMENTS

| | | | |
|---|---|---|---|
| 2002/0196332 A1 | 12/2002 | Lipton et al. | |
| 2005/0018911 A1* | 1/2005 | Deever | 382/232 |
| 2006/0158568 A1* | 7/2006 | Kaylani et al. | 348/725 |
| 2006/0177123 A1 | 8/2006 | Ha | |
| 2008/0263621 A1* | 10/2008 | Austerlitz et al. | 725/139 |
| 2010/0171817 A1 | 7/2010 | Tourapis et al. | |

FOREIGN PATENT DOCUMENTS

| | | |
|---|---|---|
| EP | 1617684 A1 | 1/2006 |
| EP | 1633148 A1 | 3/2006 |
| WO | 2008038961 A1 | 4/2008 |
| WO | WO 2010028107 A1 * | 3/2010 |

OTHER PUBLICATIONS

HDMI, http://en.wikipedia.org/wiki/HDMI.*
PCT Search Report & Written Opinion, RE: Application #PCT/US2010/059357; Feb. 28, 2011.

* cited by examiner

*Primary Examiner* — Sath V Perungavoor
*Assistant Examiner* — Jeffery Williams

(57) ABSTRACT

A 3D video conversion device is operable to convert a first MPEG stream to a second MPEG stream. The 3D video conversion device includes an input module operable to receive a multiple-view stream, a conversion module operable to convert the multiple-view stream. The conversion module includes a decoding module operable to decode the multiple-view stream, a reformatting module operable to generate 3D views from decoded information, and an encoding module operable to re-encode the 3D views to an STB format stream, and an output module operable to output a reformatted stream.

14 Claims, 10 Drawing Sheets

SAMPLED LEFT EYE PANEL 163

SAMPLED RIGHT EYE PANEL 164

QUINCUNX SAMPLING

DIAMOND FILTER

COMBINED IMAGE 166

LEFT EYE PANEL 161

RIGHT EYE PANEL 162

3D VIDEO TRANSFORMING DEVICE

BACKGROUND

There is known to be increasing interest in three-dimensional television (3D TV) and the delivery of multiple-view streams to consumer households. A stereoscopic display TV is a particular type of 3D TV in which two views, one for the left eye and one for the right eye, are displayed on the screen. Typically, the consumer uses glasses such that the left eye sees only the left eye view and the right eye sees only the right eye view.

The compression and distribution of these multiple views is known to be accomplished by use of many different standards. In particular, MPEG (Moving Picture Experts Group) standards specify a bit stream syntax and processes that are often used to decode streams corresponding to the multiple views. There are known to be other proprietary methods for handling the transport and display of multiple views. However, the decoders presently used by many set top boxes and televisions are known to be unable to decode or properly display these streams. These decoders may at best be able to decode only one (left or right eye) view. Thus, in cases where the display is capable of displaying 3D (stereoscopic or multiple) views, the decoders are known to be unable to decode the multiple views for display, and the 3D display cannot be generated.

SUMMARY

According to an embodiment, a three-dimensional (3D) video conversion device is connectable to a set top box (STB). The 3D video conversion device includes an input module operable to receive a multiple-view stream from the STB. The 3D video conversion device also includes a conversion module operable to convert the multiple-view stream. The conversion module includes a decoding module operable to decode the multiple-view stream to form a basic stream, a reformatting module operable to generate 3D views from the basic stream, an encoding module that may be bypassed and is operable to re-encode the 3D views to an STB format stream, and an output module operable to output a reformatted stream. The 3D views include a left eye view and a right eye view. Further, the 3D video conversion device includes an output module operable to output the reformatted stream having the 3D views.

According to another embodiment, a method of converting a multiple-view stream to a reformatted stream uses a 3D video conversion device. The method includes receiving the multiple-view stream from an STB. The multiple-view stream is decoded to form a basic stream. The 3D video conversion device generates a reformatted stream having 3D views from the basic stream. The 3D video conversion device thereafter outputs the reformatted stream.

Still in a further embodiment, a computer readable storage medium on which is embedded one or more computer programs implements the above-disclosed method of converting a multiple-view stream to a reformatted stream using a 3D video conversion device.

Embodiments of the present invention provide a way of decoding a multiple-view stream, reformatting the multiple-view stream to a 3D format that a 3D ready TV is operable to display and, optionally, re-encoding the decoded information in format that a decoder in an STB is operable to decode. Because 3D TV technology is an evolving field with different standards of encoding the multiple-view stream, many decoders in STBs are not able to decode the multiple-view stream and many televisions are not operable to show 3D views. The 3D video conversion device provides the capability to view programs encoded in the multiple-view stream without the expense and difficulty of replacing the television or the STB.

Further, the 3D video conversion device provides flexibility when dealing with multiple standards. Thus, the 3D video conversion device may be configured to allow existing STBs to incorporate 3D features regardless of the standard used by a broadcaster of the multiple-view stream.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

The term "single program transport stream (SPTS)," as used herein, refers to a transport stream with a single program. A transport stream is a time series of bits carrying audio and/or video information. The audio and/or video information may be decoded in order to display content using an STB.

The term "multi program transport stream (MPTS)," as used herein, refers to a transport stream with more than one program.

The term "MPEG," as used herein, refers to a group of standards for encoding and decoding transport streams as defined by the Moving Picture Experts Group. MPEG includes several formats for transport streams such as MPEG-2 and MPEG-4 part 10. STBs configured to decode streams encoded in earlier formats, such as MPEG-2 may not be able to decode streams encoded in later formats, such as MPEG-4 part 10 also known as Advanced Video Coding (AVC).

The term "view," as used herein, refers to a single image or series of images, for instance in a conventional video stream.

The term "three-dimensional (3D) view," as used herein, refers to a plurality of views that may be used to present 3D video on a television. For instance, the 3D view may refer to a stereoscopic view, which is comprised of two views, a right eye view and a left eye view. Alternately, the 3D view may be comprised of more than two views in instances where the video is formatted and the television is enabled to display the more than two views.

The term "dual stream," as used herein, refers to a pair of streams carrying 3D visual information configured to be decoded by dual decoder in order for a television to display 3D video.

The term "dual decoder," as used herein, refers to a device that may be used to decode a pair of streams. For instance, the dual decoder may be configured to decode a stream carrying 3D left eye view and a stream carrying a right eye view and to thereby display 3D video on a television.

The term "operably connected," as used herein, refers to a device being connected to another device such that one device is operable to achieve a predetermined effect on the other device.

Figure 1:
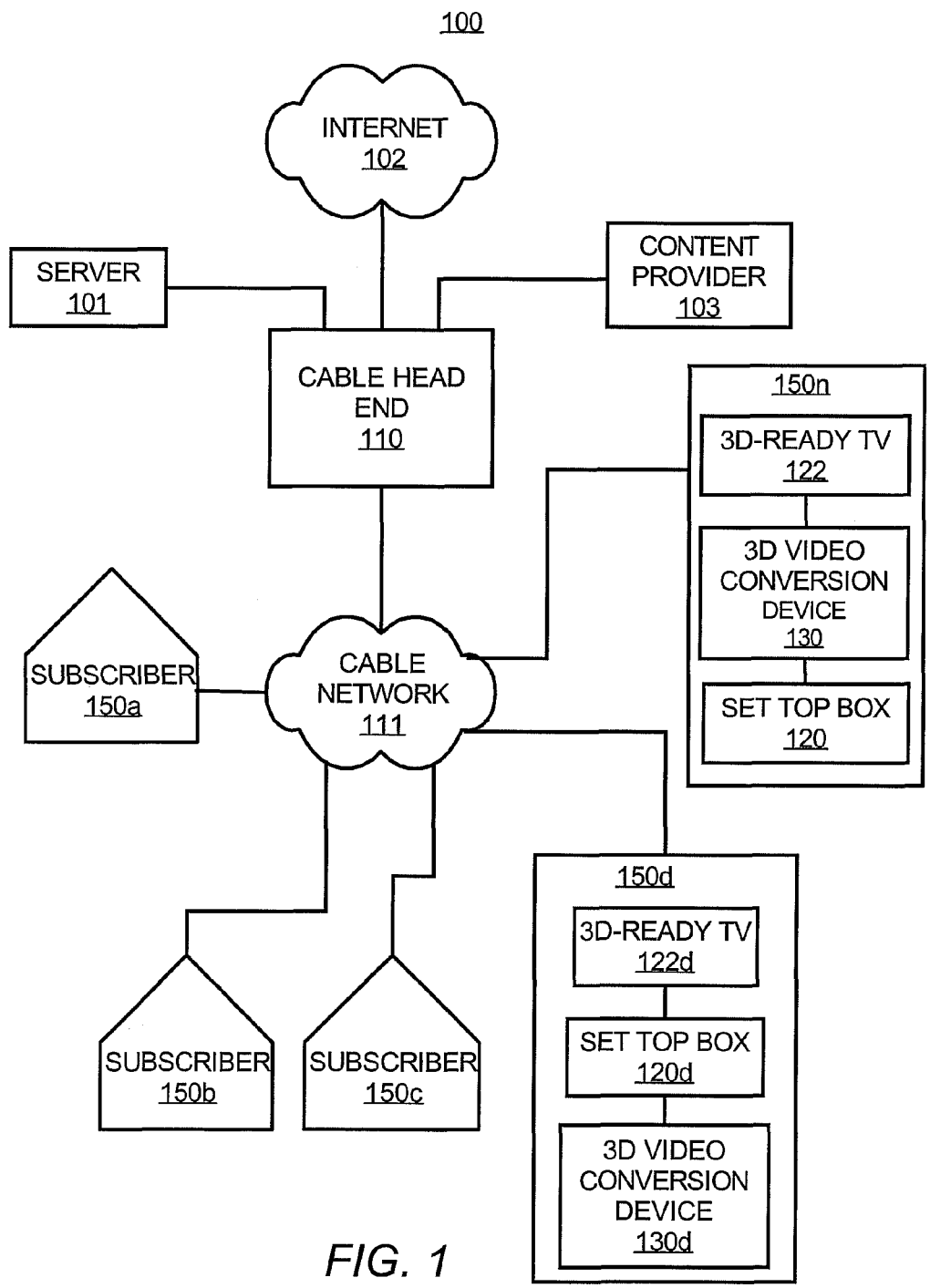
FIG. 1 illustrates a network architecture, according to an embodiment of the invention.

FIG. 1 illustrates a network architecture 100 in which a 3D video conversion device 130 may be used, according an embodiment. As shown in FIG. 1, the network architecture 100 is illustrated as a cable television (CATV) network architecture 100, including a cable head-end unit 110 and a cable network. A number of data sources 101, 102, 103, may be communicatively coupled to the cable head-end unit 110 including, but in no way limited to, a plurality of servers 101, the Internet 102, radio signals, or television signals received via a content provider 103. The cable head-end 110 is also communicatively coupled to one or more subscribers 150*a-n* through a cable network 111.

Figure 2:
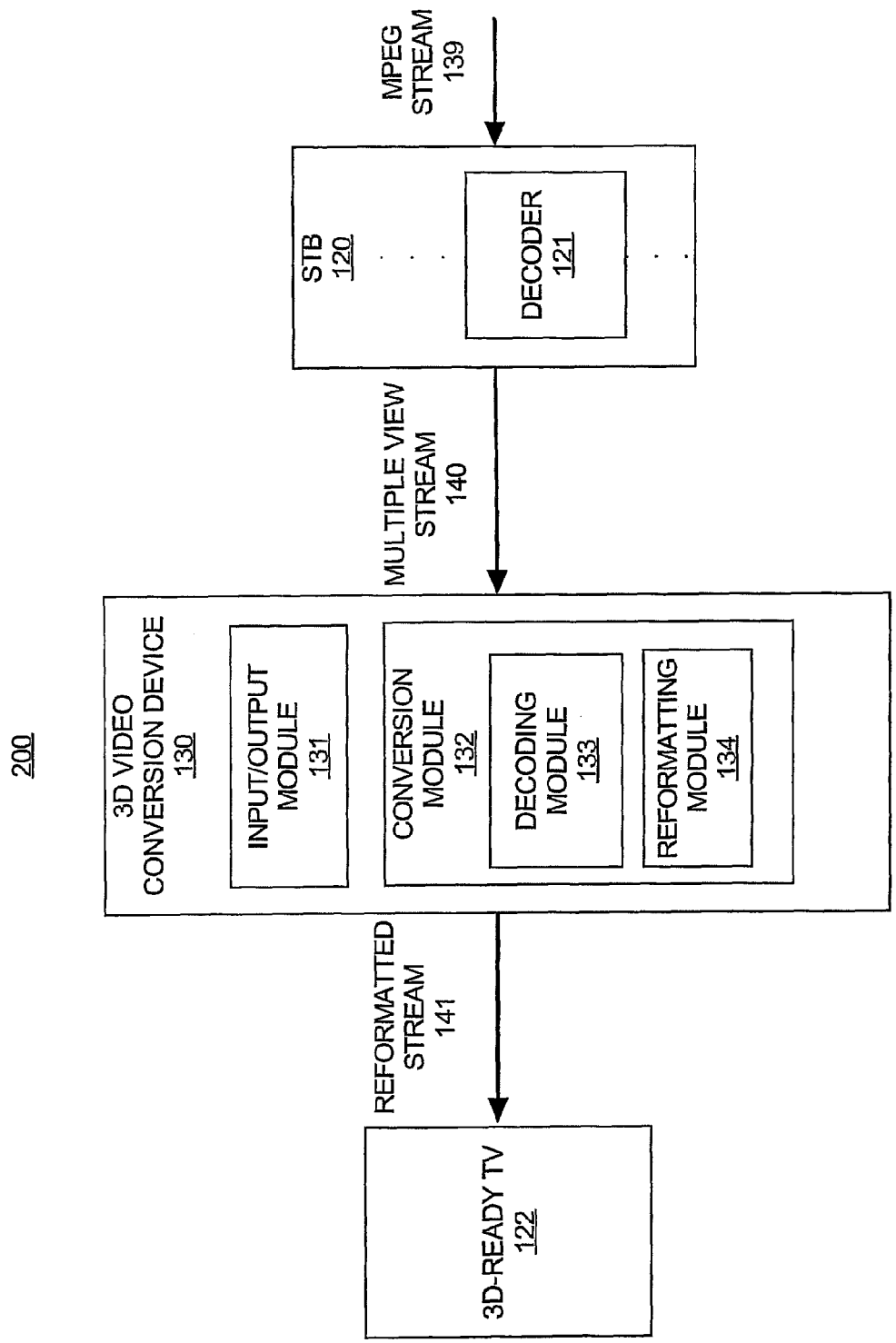
FIG. 2 illustrates a simplified block diagram of a 3D video conversion device configured to convert a multiple-view stream to a reformatted stream, according to an embodiment of the invention.

It should be understood that the 3D video conversion device 130 and a set top box 120 to which it is connected, may be used in other networks and that the cable network architecture is shown for simplicity and illustrative purposes. The 3D video conversion device 130 may be used in any network providing an MPEG stream 139 to the STB 120, as shown in FIG. 2. For instance, the 3D video conversion device 130 may be used in a network providing the MPEG stream 139 directly to the STB 120. Alternately, the MPEG stream may comprise Internet Protocol (IP) packets or any packetization scheme configured to transmit the MPEG stream 139. The MPEG stream 139 may be received from a satellite transmission, the Internet or other network.

The cable network 111 provides the MPEG stream 139 to each of the subscribers 150*a-n* using, for instance, fixed optical fibers or coaxial cables. The MPEG stream 139 in this instance may be a QAM modulated stream. Each of the subscribers 150*a-n* may receive the MPEG stream 139 at an STB. For instance, the subscriber 150*n* may receive the MPEG stream 139 at an STB 120. The STB 120 may thereafter select a frequency and demodulate the frequency to obtain a multi program transport stream (MPTS). Further, the cable network 111 is configured to provide a plurality of programs multiplexed together in the MPTS to the STB 120. The STB 120 is configured to demultiplex the MPTS to extract a single program transport stream (SPTS) corresponding to each of the plurality of programs which a subscriber may select. The subscriber 150*n* may use the STB 120 to select a program with 3D information.

The program with 3D information is carried in a transport stream comprising a multiple-view stream 140 shown in FIG. 2. The multiple-view stream 140 may be encoded in an MPEG format that specifies a bit stream syntax and a process required to decode the streams corresponding to the 3D views. The bit stream may contain flags that identify whether it contains a multiple-view stream, and the STB 120 determines if the bit stream includes the multiple-view stream 140 if so indicated by the flags and then sends the stream to the 3D video conversion device 130. The STB 120 is a device that enables a television set to receive digital television (DTV) broadcasts. According to an embodiment, the STB 120 is operable to receive and demultiplex the MPTS to form the multiple-view stream 140, and has a decoder such as a decoder 121 shown in FIG. 2. In one embodiment, the STB 120 includes any device, not just a conventional STB that can perform the functions of the STB 120 described herein.

The multiple-view stream 140 is a video stream carrying 3D information encoded in a format that a decoder in a legacy STB is not able to decode. The 3D information may be comprised of multiple related views that required for displaying 3D video. For instance, the multiple-view stream 140 may carry 3D information that may be decoded to form stereoscopic images comprised of a left eye view and a right eye view. Alternately, the multiple-view stream 140 may carry information that may be decoded to form more than two views. The multiple-view stream 140 may also include multiple sub-streams and information related to the depth of the objects in the scene.

The subscriber 150*n* may have a 3D-ready TV 122 capable of displaying 3D (stereoscopic or multiple) views, however the decoder 121 in the STB 120 may be inoperable to decode the multiple-view stream 140 in order to display the 3D views at the 3D-ready TV 122. For instance, many STBs are operable to decode only one of the 3D views (left eye view or right eye view). The STB 120 may therefore require the multiple-view stream 140 to be converted to a format that is displayable at the 3D-ready TV 122. In order to display the 3D views at the 3D-ready TV 122, the STB 120 may be configured to transmit the multiple-view stream 140 to a 3D video conversion device 130 as is shown with respect to FIG. 2 below. The 3D video conversion device 130 is configured to send a reformatted stream 141 to the 3D-ready TV 122 as will be further described with respect to FIGS. 2 and 3 hereinbelow.

The STB 120 may include a decoder 121. The decoder 121 may be a decoder configured to decode an STB format stream, such as an STB format stream 142 (shown in FIG. 3). The STB format stream 142 may be, for instance, an MPEG-2 compliant stream, or an MPEG-4 part 10 compliant stream, depending on a decoding capability of the decoder. The decoder 121 may thus be a conventional decoder as may be found in many conventional STBs currently used by multi-service operators (MSOs) to provide cable service. In order to display the 3D views at the 3D-ready TV 122, the STB 120 may be configured to transmit the multiple-view stream 140 to a 3D video conversion device 130*b* and to receive the STB format stream 142 as is described with respect to FIGS. 3 and 9 and a method 500 hereinbelow. The 3D video conversion device 130*b* and the 3D conversion device 130*d* are alternate configurations of the 3D video conversion device 130.

The subscribers 150*a-n* may have different configurations of customer premises equipment. For example, as shown with respect to subscriber 150*d*, the STB 120*d* receives and demultiplexes the modulated stream as in FIG. 1 to produce the multiple-view stream 140 and to send the multiple-view stream 140 to the 3D video conversion device 130*d* for processing. Alternately, as will be described with respect to FIGS. 3 and 9 and the method 500 hereinbelow, the STB 120 may be configured to receive an output STB format stream 142 from the 3D video conversion device 130*b*. In this instance, the decoder 121 in the STB 120 is configured to decode an STB format stream.

Figure 3:
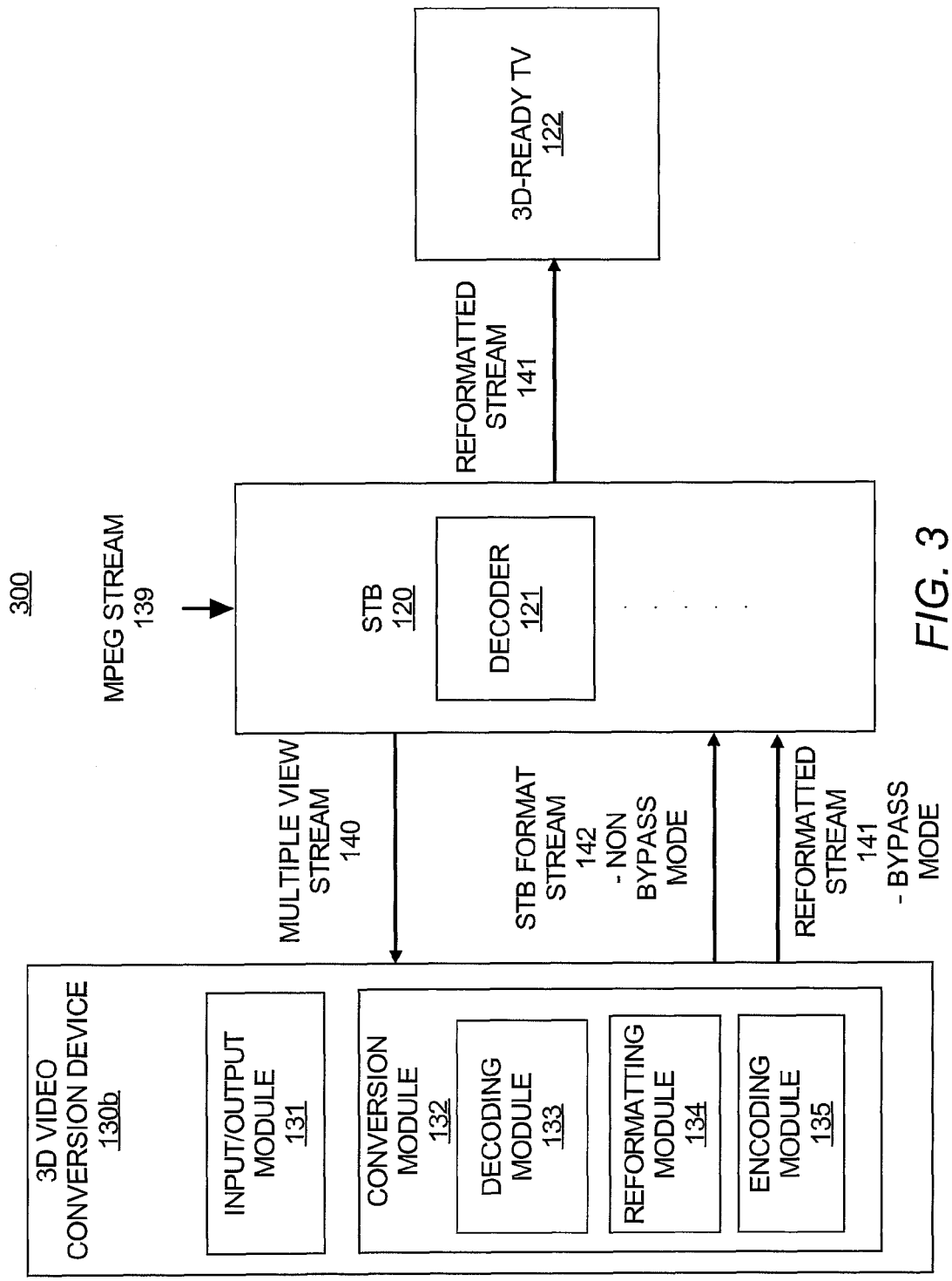
FIG. 3 illustrates a simplified block diagram of a 3D video conversion device configured to convert a multiple-view stream to an STB format stream, according to an embodiment of the invention.

FIGS. 2 and 3 illustrate simplified block diagrams of systems 200 and 300 configured to convert a multiple-view stream 140, according to an embodiment. Each of the systems 200 and 300 comprise the 3D video conversion device 130, the STB 120 and the 3D-ready TV 122. The 3D video conversion device 130 is configured to perform a method 400, as described hereinbelow with respect to FIG. 8. The 3D video conversion device 130 includes an input/output module 131, which is configured to receive the multiple-view stream 140 from the STB 120 and to output the reformatted stream 141 to the 3D-ready TV 122. According to an embodiment, the input/output module 131 comprises a Universal Serial Bus (USB), an Ethernet interface, or another type of interface. The 3D video conversion device 130 also includes a conversion module 132, which is configured to convert the multiple-view stream 140 into the reformatted stream 141. The conversion module 132 may be comprised of a decoding module 133, and a reformatting module 134. The 3D video conversion device 130 may be operably connected to the STB 120 at the input/output module 131 of the 3D video conversion device 130. In the alternate configuration of the 3D video conversion device 130*b*, as shown in FIG. 3, an encoding module 135 is also included in the 3D video conversion device 130*b*.

The components 131-135 may comprise software, hardware, or a combination of software and hardware. Thus, in one embodiment, one or more of the modules 131-135 comprise circuit components. In another embodiment, one or more of the modules 131-135 comprise software code stored on a computer readable storage medium, which is executable by a processor. It should be understood that the system 200 depicted in FIG. 2 may include additional components and that some of the components described herein may be removed and/or modified without departing from a scope of the system 200.

As shown in FIGS. 2 and 3, the 3D video conversion device 130 may be configured to interface with the STB 120 and a decoder 121 where security protocol issues between the STB 120 and external devices may arise, including the requirement for decryption keys. Note that the 3D video conversion device 130 may be operably connected to devices other than an STB, such as a television, a receiver, or any device containing the decoder 121. For instance, when the multiple-view stream 140 arrives at the STB 120, it may be encrypted and the STB 120 may have a key to decrypt it. According to an embodiment, a security engine (not shown) in the 3D video conversion device 130 is similarly configured and authorized as a security engine (not shown) in the STB 120 and decoder 121, allowing the system 100 to maintain security requirements. The 3D video conversion device 130 may be authorized in the same manner as the STB 120 by the MSO or other provider. According to another embodiment, the STB 120 and the 3D video conversion device 130 use a standard protocol to communicate. For instance, many existing set-top boxes may support digital transmission content protection (DTCP) 5C. This protocol utilizes the security engine of the STB 120 to decrypt the multiple-view stream 140, the STB 120 then re-encrypts the multiple-view stream 140 with the 5C keys prior to sending to the 3D video conversion device 130.

The input/output module 131 of the 3D video conversion device 130 receives the multiple-view stream 140 from the STB 120. The multiple-view stream 140 is subsequently sent to the decoding module 133 of the 3D video conversion device 130. The decoding module 133 is operable to decode the multiple-view stream 140 to form a basic stream (not shown). The basic stream is baseband video. The decoding module 133 may include conventional components for decoding the multiple-view stream 140 including an entropy decoder, an inverse transformer, an inverse quantizer, a motion compensator, and a spatial predictor. The decoding module 133 is configured to subsequently transfer the decoded multiple-view stream 140 to the reformatting module 134.

The reformatting module 134 is configured to receive and reformat the basic stream. According to an embodiment, the reformatting module 134 generates 3D views (for instance, a left eye view and a right eye view), carried by separate compressed streams for each view, from the basic stream. Alternately, the reformatting module may generate more than two views if the multiple-view stream 140 contains 3D information regarding more than two views. The reformatting module 134 is operable to synchronize the 3D views and thereby generate a reformatted stream 141. The reformatted stream 141 comprises decoded and reformatted video that may be displayed on the 3D-ready TV 122.

Figure 4:
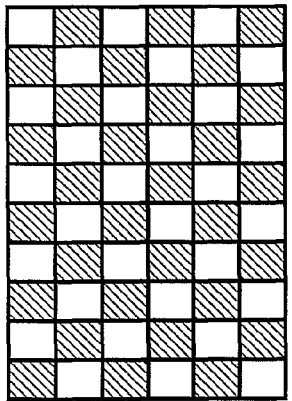
FIG. 4 illustrates a diagram of a checkerboard pattern format, according to an embodiment of the invention.
Figure 4:
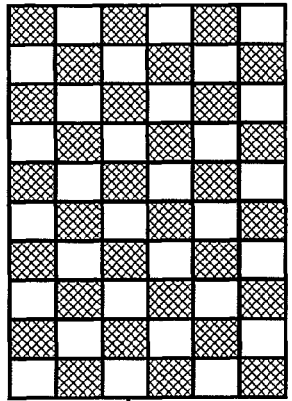
Figure 4:
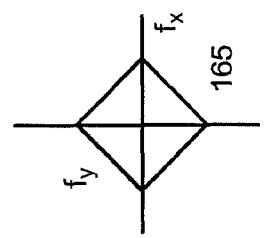
Figure 4:
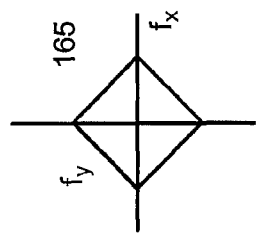
Figure 4:
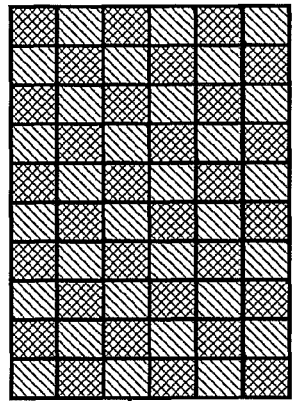
Figure 4:
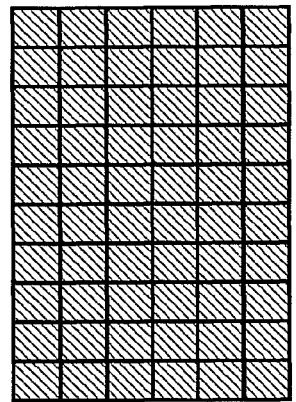
Figure 4:
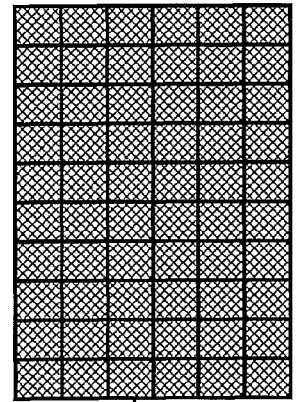

According to an embodiment, the reformatting module 134 reformats the basic stream in a checkerboard pattern format of left and right 3D views, as shown in FIG. 4. The checkerboard pattern format may be generated by quincunx sampling using a diamond filter 165 on a left eye panel 161 and a right eye panel 162. The diamond filter samples the left eye panel 161 and similarly the right eye panel 162 to form a sampled left eye panel 163 and a sampled right eye panel 164. The sampled panels are intermixed in a combined image 166 in the checkerboard pattern. The checkerboard pattern format is spatial sequential. Currently many commercially available 3D TVs are operable to take video intermixed in this format in the reformatted stream 141, separate the 3D views and display in a 3D format.

Figure 5:
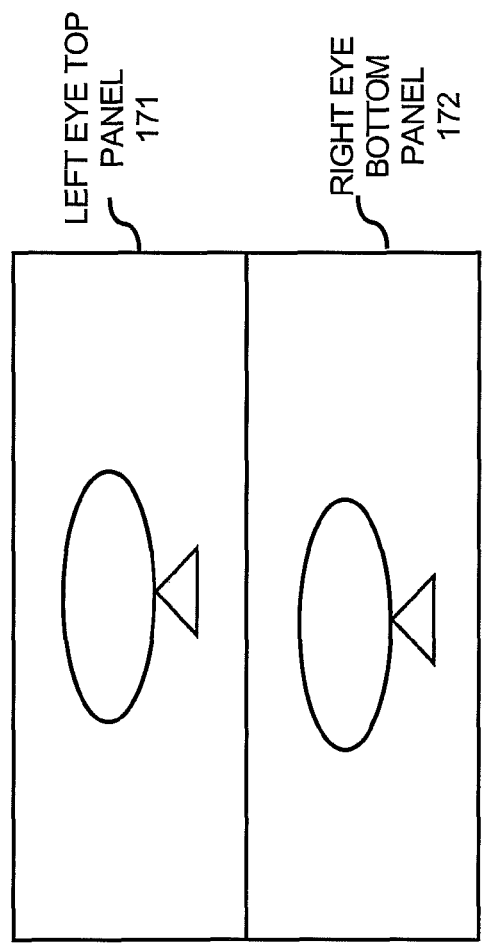
FIG. 5 illustrates a diagram of a top-and-bottom format, according to an embodiment of the invention.

According to another embodiment, the reformatting module 134 reformats the basic stream in a top-and-bottom format, as shown in FIG. 5. For instance, the left eye view may comprise a left eye top panel 171 and the right eye view a right eye bottom panel 172 of a same video frame. Currently many commercially available 3D TVs are operable to take video intermixed in this format in the reformatted stream 141, separate the 3D views and display in a 3D format.

Figure 6:
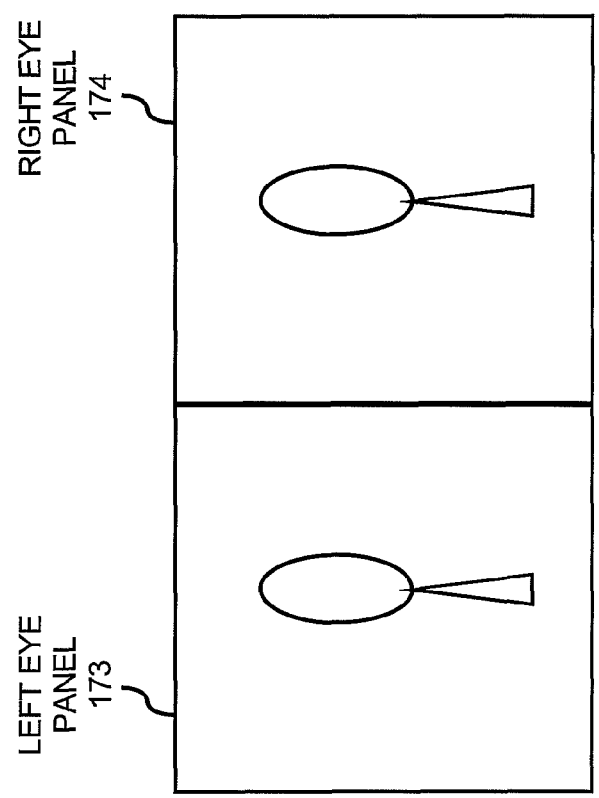
FIG. 6 illustrates a diagram of a side-by-side left and right view format, according to an embodiment of the invention.

According to another embodiment, the reformatting module 134 reformats the basic stream in a side-by-side left and right view (for instance, half vertical panel for each view) format, as shown in FIG. 6. In the side-by-side left and right view format, the left view forms a left side panel 173 and the right eye view forms a right side panel 174 of each video frame. Currently some commercially available 3D TVs are operable to accept the reformatted stream 141 configured in this format. The reformatted stream 141 may be directly output to the 3D-ready TV 122 as shown in FIG. 3.

Figure 7:
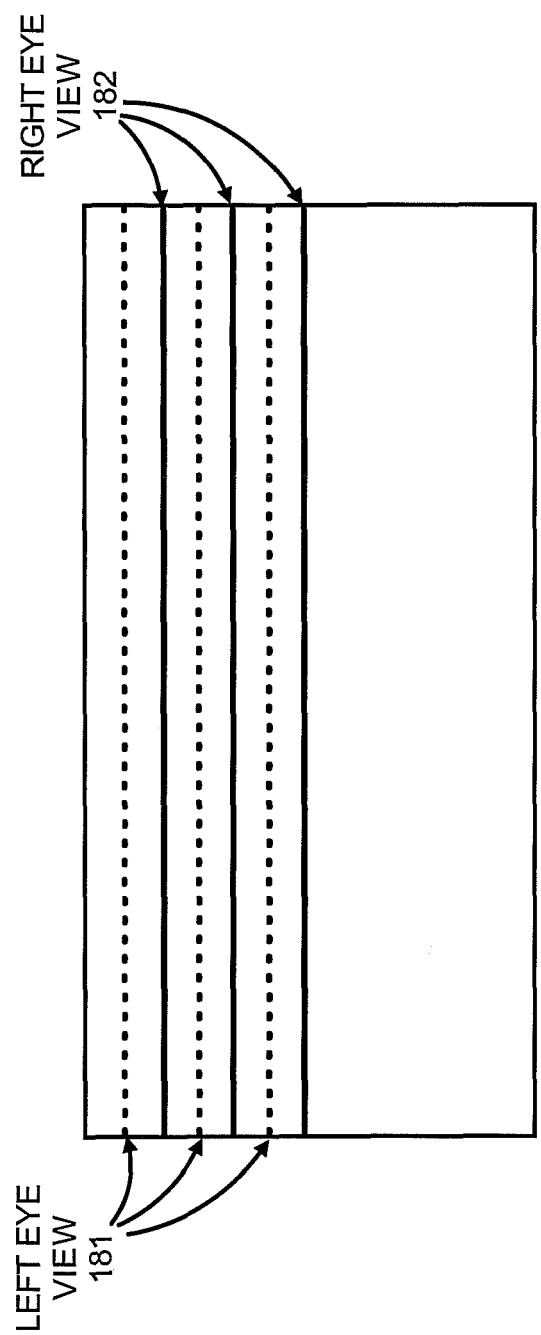
FIG. 7 illustrates a diagram of a left and right eye view line interleaved format, according to an embodiment of the invention.

According to another embodiment, the reformatting module 134 reformats the basic stream in a left and right eye view line interleaved format, as shown in FIG. 7. For instance, all odd numbered lines 181 may carry the left eye view while the even numbered lines 182 carry the right eye view. The left and right eye view line interleaved format is spatial sequential for the left and right views. Currently many commercially available 3D TVs are operable to take video intermixed in this format in the reformatted stream 141, separate the 3D views and display in a 3D format.

The reformatting module 134 may reformat the basic stream using other 3D formats not shown. These include a frame packing format in which a full left eye view follows a full right eye view and a color interleaved format, in which colors are interleaved on even and odd numbered lines. The frame packing format is time sequential.

Note that the reformatted stream 141 may not be encoded. Thus, the 3D-ready TV 122 does not need a decoder to decode the reformatted stream 141, and can display the content from the reformatted stream 141 in 3D.

FIG. 3 shows the system 300 which is an alternate embodiment of the system 200. As shown in FIG. 3, the system 300 includes a different arrangement of the devices and the modules within the 3D video conversion device 130. In the system 300, the STB 120 may be configured to operate in bypass mode, and the reformatted stream 141 is output to the 3D-ready TV 122 through the STB 120. In bypass mode, the reformatted stream 141 bypasses the decoder 121 in the STB 120. Additionally, the system 300 may operate in a non-bypass mode.

In the non-bypass mode, the 3D video conversion device 130b sends the reformatted stream 141 to the encoding module 135 after reformatting the basic stream in order to re-encode the reformatted stream 141 to form the STB format stream 142. When the encoding module 135 receives the reformatted stream 141, the encoding module 135 re-encodes the reformatted stream 141 into a particular format matching the capability of the decoder 121 in the STB 120, for instance MPEG-2 or MPEG-4 part 10 format. The encoding format is predetermined based on the decoder 121. If the encoding module 135 re-encodes the STB format stream 142 in the above-mentioned formats, the STB 120 requires no extra capability as compared to a conventional STB. The decoder 121 required to decode the STB format stream 141 in the above mentioned embodiments may be a single decoder, configured to decode MPEG-2, MPEG-4 AVC or any compression technology used by the encoding module 135 to re-encode the 3D views.

According to another embodiment, the 3D video conversion device 130b reformats and re-encodes the STB format stream 142 with the 3D views and the input/output module 131 sends the STB format stream 142 in a dual stream format, using for instance two MPEG-2 streams. The 3D video conversion device 130b may be configured to output the STB format stream 142 over a dual high-definition multimedia interface (HDMI). The decoder 121 required to decode the STB format stream 142 may be a dual decoder configured to decode the dual stream and to send the decoded 3D views to the 3D-ready TV 122 to be displayed. Further, the 3D video conversion device 130b may be configured to output the STB format stream 142 to conform to the capabilities of the STB 120, the decoder 121, and the 3D TV 122. For instance, the 3D video conversion device 130b, HDMI and cable(s) with which the 3D video conversion device 130b may be operably connected to the STB 120 may be configured to support an STB format stream 142 carrying a 1080p24 (1920×1080 progressive scan high definition television (HDTV) format at 24 Hertz) image for each 3D view. The STB format stream 142 in this instance is configured at 1080p48.

It will be apparent that the systems 200 and 300 may include additional elements not shown and that some of the elements described herein may be removed, substituted and/or modified without departing from the scope of the systems 200 and 300. It should also be apparent that one or more of the elements described in the embodiment of FIGS. 2 and 3 may be optional. For example, when the output of the 3D video conversion device 130b is connected to TV directly, as shown in subscriber 150n of FIG. 1 and in the system 200 of FIG. 2, then the encoding module 135 may not be present.

Figure 8:
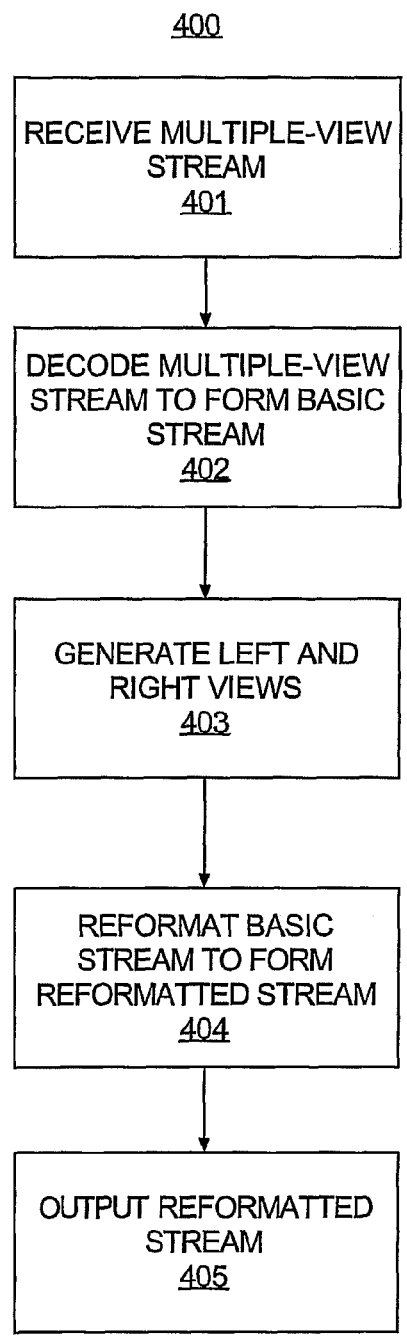
FIG. 8 illustrates a flow diagram of a method of converting a multiple-view stream into a reformatted stream, according to an embodiment of the invention.

An example of a method in which the system 200 may be employed for converting a multiple-view stream 1o a reformatted stream is now described with respect to the following flow diagram of the method 400 depicted in FIG. 8. It should be apparent to those of ordinary skill in the art that the method 400 represents a generalized illustration and that other steps may be added or existing steps may be removed, modified or rearranged without departing from the scopes of the method 400. In addition, the method 400 is described with respect to the system 200 by way of example and not limitation, and the method 400 may be used in other systems.

Some or all of the operations set forth in the method 400 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

At step 401, as shown in FIG. 8, the 3D video conversion device 130 receives the multiple-view stream 140. The multiple-view stream 140 may be received from the STB 120 operably connected to the 3D video conversion device 130. The input/output module 131 of the 3D video conversion device 130 is configured to receive the multiple-view stream 140 and to send the multiple-view stream 140 to the decoding module 106.

At step 402, the decoding module 133 decodes the multiple-view stream 140 to form a basic stream. The decoding module 133 then sends the basic stream to the reformatting module 134.

At step 403, the reformatting module 134 uses the basic stream to generate a left and a right view comprising a 3D image and reformats the basic stream to form the reformatted stream 141 at step 404. At step 405, the reformatted stream 141 may be output to the 3D-ready TV 122. The reformatted stream 141, which is not compressed or encoded, may be output over an HDMI Interface.

An example of a method in which the system 400 may be employed for converting a multiple-view stream 140 to the STB format stream 142 now be described with respect to the following flow diagram of the method 600 depicted in FIG. 9. It should be apparent to those of ordinary skill in the art that the method 500 represents a generalized illustration and that other steps may be added or existing steps may be removed, modified or rearranged without departing from the scopes of the method 500. In addition, the method 500 is described with respect to the system 300 by way of example and not limitation, and the method 500 may be used in other systems.

The steps 501 to 504 of the method 500 are identical to the steps 401 to 404 of the method 400. When the 3D video conversion device 130b is connected to the STB operating in bypass mode, the reformatted stream 141 is sent to the STB 120 at the step 505. The STB 120 may be configured to thereafter send the reformatted stream 141 to the 3D-ready TV 122.

However after step 504, in contrast to step 404 of the method 400, if the 3D video conversion device 130b is connected to the STB 120 operating in non-bypass mode, the reformatted stream 141 is sent from the reformatting module 134 to the encoding module 135.

At step 506, if the 3D video conversion device 130b is connected to the STB 120 operating in non-bypass mode, the encoding module 135 encodes the reformatted stream 141 into the STB format stream 142. The encoding module 135 may be configured to encode the STB format stream 142 into a particular format based upon the configuration of a decoder 121 in the STB 120. According to an embodiment, the STB format stream 142 may be reformatted in one of a checkerboard pattern format, a left and right eye view line interleaved format, and a side-by-side left and right view format where the decoder 121 is a single decoder. According to another embodiment, the encoding module 135 re-encodes each of the 3D views of the reformatted stream 141 having the 3D views into the STB format stream 142 independently. According to another embodiment, the STB format stream 142 may be reformatted in a dual stream comprising left and right 3D views.

At step 507, the input/output module 131 outputs the STB format stream 142 to the STB 120 operating in non-bypass mode. The STB format stream 142 may be output over a single HDMI interface to the STB 120. If the output is compressed to generate MPEG-2 or MPEG-4 compliant streams, the STB format stream 142 may be output over Ethernet or Universal Serial Bus (USB). The STB 120 may be configured to decode the STB format stream 142 to form the reformatted stream 141 and to subsequently send the reformatted stream 141 to the 3D-ready TV 122.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

Figure 9:
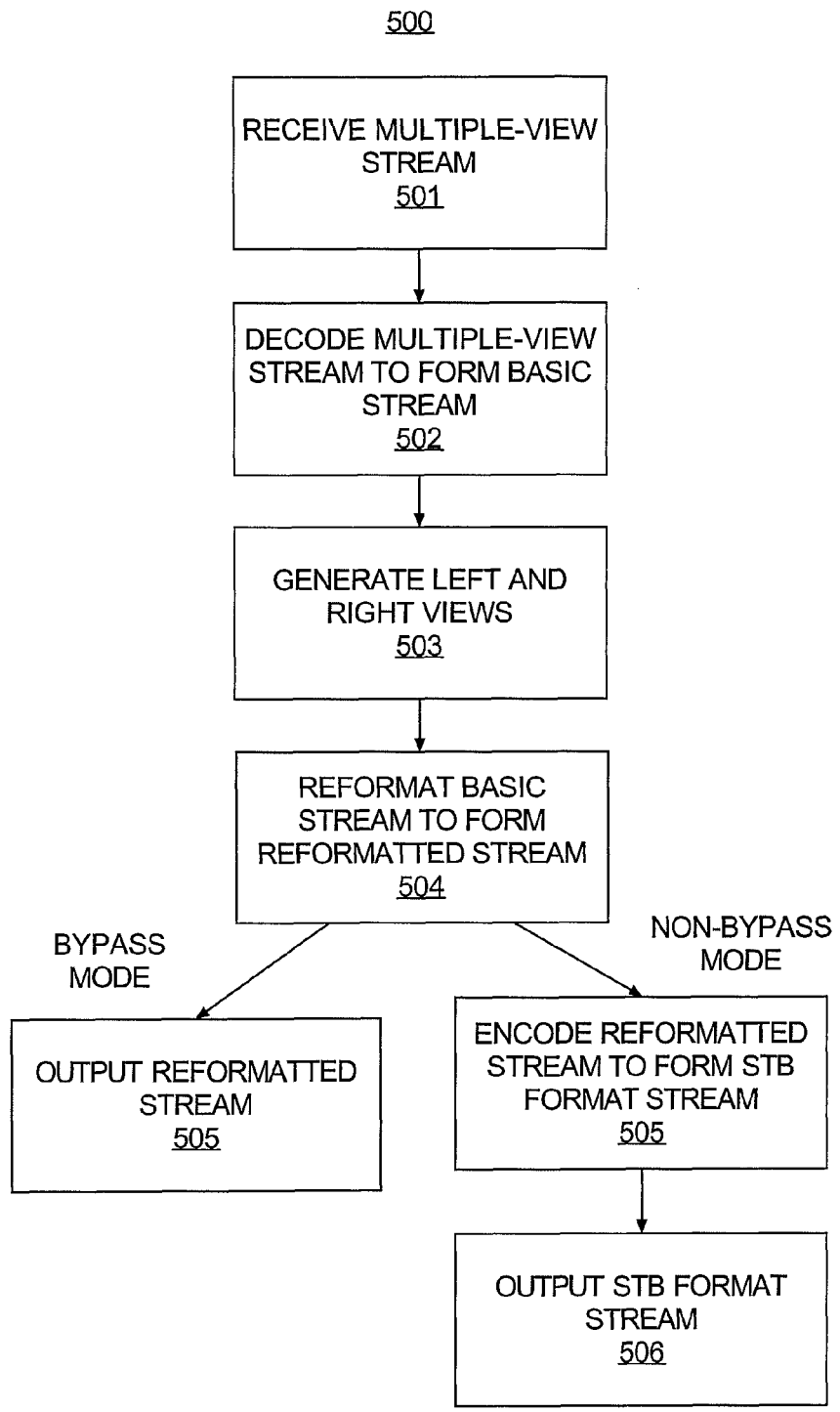
FIG. 9 illustrates a flow diagram of a method of converting a multiple-view stream into an STB format stream, according to an embodiment of the invention.
Figure 10:
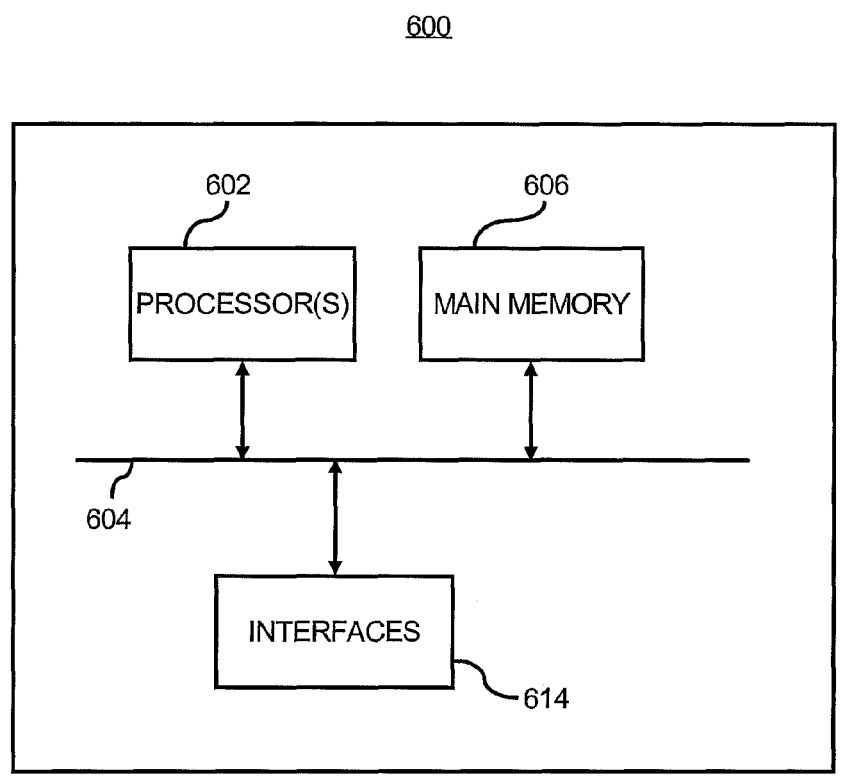
FIG. 10 shows a block diagram of a computer system that may be used in the 3D video conversion device, according to an embodiment of the invention.

FIG. 10 illustrates a block diagram of a computing apparatus 600 to implement or execute one or more of the processes depicted in FIGS. 1-9, according to an embodiment. It should be understood that the illustration of the computing apparatus 600 is a generalized illustration and that the computing apparatus 600 may include additional components and that some of the components described may be removed and/or modified without departing from a scope of the computing apparatus 600. According to an embodiment, the computing apparatus 600 comprises the 3D video conversion device 130 depicted in FIGS. 2 and 3.

The computing apparatus 600 includes a processor 602 that may implement or execute some or all of the steps described in one or more of the processes depicted in FIGS. 8-9. Commands and data from the processor 602 are communicated over a communication bus 604. The computing apparatus 600 also includes a main memory 606, such as a random access memory (RAM), where the program code for the processor 602, may be executed during runtime and a hard disk (not shown) where a copy of the program code for one or more of the processes depicted in FIGS. 8-9 may be stored. Alternately, the computing apparatus 600 may include non-volatile memory. In addition, the computing apparatus 600 includes interfaces such as coaxial cable, HDMI or USB.

According to an embodiment, the 3D video conversion device 130 may comprise a pluggable dongle. For instance, the 3D conversion device 130 may be operably connected to an STB 120 and a 3D-ready TV 122 to decode multiple-view streams.

Embodiments of the present invention provide a way of decoding a multiple-view stream and re-encoding the decoded information in a 3D format that a decoder in an STB may be operable to decode. Because 3D TV technology is an evolving field with different standards of encoding the multiple-view streams, many decoders in STBs are not able to decode multiple-view streams and many televisions are not operable to show 3D views. The device provides the capability to view programs encoded in the multiple-view streams without the expense and difficulty of replacing the television or the STB.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are meant in their broadest reasonable sense unless otherwise indicated.

What is claimed is:

1. A three-dimensional (3D) video converting device connectable to a set top box (STB), the 3D video conversion device comprising:
   an input module operable to receive a multiple-view stream from the STB;
   a conversion module operable to convert the multiple-view stream including,
      a decoding module operable to decode the multiple-view stream to form a basic stream, and
      a reformatting module operable to generate a reformatted stream having 3D views from the basic stream, wherein the 3D views include a left eye view and a right eye view; and
   an output module operable to output the reformatted stream,
   wherein the STB is configured to receive a STB format stream containing 2D data that the STB is configured to decode, but the STB is not configured to separately decode a second format stream containing 3D data,
   wherein the conversion module further includes:
      an encoding module operable to re-encode the reformatted stream having the 3D views into the STB format stream, wherein the STB format stream is in a format that a decoder of the STB is operable to decode; and
      wherein the output module is operable to output the STB format stream to the STB.

2. The 3D video conversion device of claim 1, wherein the encoding module is configured to re-encode each of the 3D views of the reformatted stream having the 3D views into the STB format stream independently.

3. A three-dimensional (3D) video converting device connectable to a set top box (STB), the 3D video conversion device comprising:
   an input module operable to receive a multiple-view stream from the STB;
   a conversion module operable to convert the multiple-view stream including,
      a decoding module operable to decode the multiple-view stream to form a basic stream, and
      a reformatting module operable to generate a reformatted stream having 3D views from the basic stream, wherein the 3D views include a left eye view and a right eye view; and
   an output module operable to output the reformatted stream, wherein the 3D video conversion device is configured to output the reformatted stream to one of a 3D-ready television (TV) and the STB, wherein the reformatted stream bypasses a decoder in the STB.

4. The 3D video conversion device of claim 1, wherein the 3D video conversion device is connected to an input of one of a STB, a 3D-ready TV, a personal computer (PC) and a receiver; and wherein the reformatted stream is output from the output module in a format decodable by the one of the STB, the 3D-ready TV, the PC and the receiver.

5. The 3D video conversion device of claim 1, wherein the reformatted stream is generated in a format comprising one of a checkerboard pattern format, a side-by-side left and right view format, and a left and right view interleaved format; and wherein the reformatted stream is output over a single high definition multimedia interface (HDMI).

6. The 3D video conversion device of claim 1, wherein the reformatted stream is output in a left and right eye view dual stream format and the reformatted stream is output over a dual HDMI.

7. The 3D video conversion device of claim 1, wherein the output module or the input module is configured to output or input the STB format stream over a Universal Serial Bus (USB) interface or an Ethernet interface.

8. A method of converting a multiple-view stream using a 3D video conversion device, the method comprising:

receiving the multiple-view stream in a first format from a STB, wherein the first format is a 3D video format that the STB is not configured to decode;

decoding, by the 3D video conversion device, the multiple-view stream to form a basic stream;

generating a reformatted stream having 3D views from the basic stream, wherein the 3D views include a left eye view and a right eye view; and outputting the reformatted stream, wherein after generating the reformatted stream having the 3D views from the basic stream, re-encoding the reformatted stream having the 3D views into a second STB format stream, wherein the second STB format stream is in a format that a decoder of the STB is operable to decode; and outputting the second STB format stream to the STB.

9. The method of claim 8, wherein re-encoding reformatted stream having the 3D views into the second STB format stream comprises re-encoding each of the 3D views of the reformatted stream having the 3D views into the second STB format stream independently.

10. The method of claim 8, wherein the STB format stream is encoded in a dual stream format, the second STB format stream is output over a dual HDMI, and the decoder comprises a dual decoder.

11. The method of claim 8, wherein generating the reformatted stream having 3D views from the basic stream further comprises:

generating the reformatted stream in one of a checkerboard pattern format, a side-by-side left and right view format, a top-and-bottom format, and a left and right eye view interleaved format.

12. The method of claim 8, wherein outputting the reformatted stream to the STB further comprises:

outputting the reformatted stream over a single HDMI to a receiver comprising a single decoder in the STB.

13. The method of claim 8, wherein the output module or the input module is configured to output or input the second STB format stream over a USB interface or an Ethernet interface.

14. The method of claim 8, wherein the outputting the reformatted stream comprises outputting the reformatted stream to one of a 3D-ready TV and the STB, wherein the reformatted stream bypasses a decoder in the STB.

* * * * *